June 23, 1953   C. A. GUNTHER ET AL   2,642,934
GAS FUELED WATERING TROUGH HEATER AND DRAFT SHIELD
Filed Nov. 29, 1948
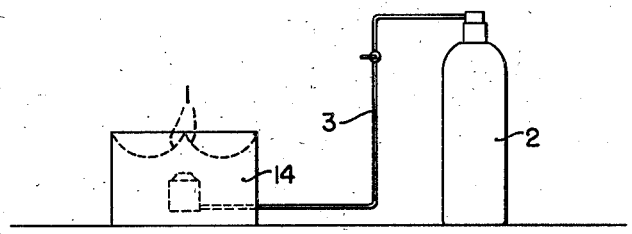
FIG. 1
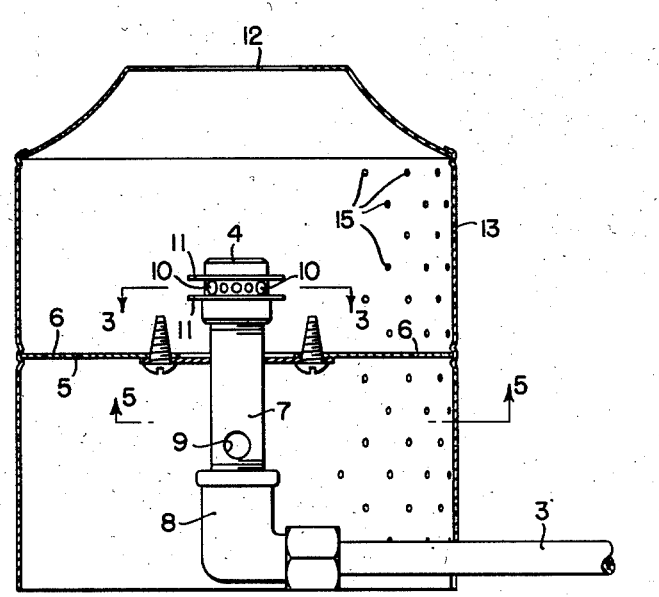
FIG. 2
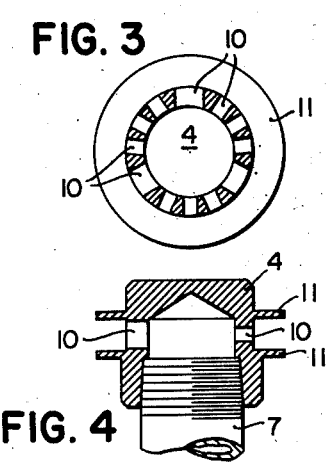
FIG. 3
FIG. 4
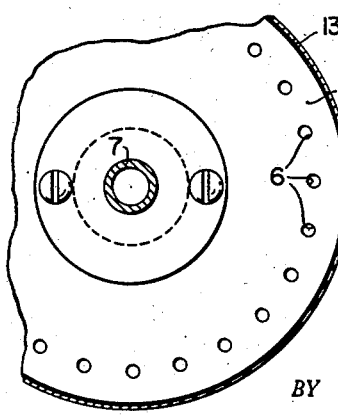
FIG. 5
INVENTORS.
C. A. GUNTHER
C. R. VITTETOE
BY
Merrill M. Blackburn.
ATTORNEY

Patented June 23, 1953

2,642,934

UNITED STATES PATENT OFFICE 2,642,934

GAS FUELED WATERING TROUGH HEATER AND DRAFT SHIELD

Charles A. Gunther, Lisbon, and Charles R. Vittetoe, Mount Vernon, Iowa

Application November 29, 1948, Serial No. 62,464

3 Claims. (Cl. 158—99)

This invention relates to heaters and more particularly to a heater adapted to maintain the water in an animal outdoor drinking fountain at suitable temperature in winter weather so that the animals will be encouraged to partake freely.

One object of the invention is to provide an improved burner which will not blow out due to winds.

Another object is to provide an improved burner in which the burner will be free from clogging.

A further object is to provide a burner for animal drinking fountains which will be trouble-free.

A still further object is to provide a heater for animal drinking fountains that will retain the water at a temperature which will encourage the animals to drink freely.

A still further object is to provide a heater for an animal drinking fountain that will be suitable for outdoor use.

Still further objects of the invention will become apparent upon considering the following specification, which, when considered in conjunction with the accompanying drawing, illustrates a preferred form of the invention.

In the drawings annexed hereto and forming a part hereof,

Fig. 1 is a side elevation of a system utilizing the heater of our invention;

Fig. 2 represents a vertical, substantially central section of the burner constituting the subject matter of this invention;

Fig. 3 represents a horizontal section through the center of the burner head, substantially along the plane indicated by the line 3—3 Fig. 2;

Fig. 4 represents a vertical central section through the burner head; and

Fig. 5 represents a fragmentary horizontal section below the central partition wall, looking upwardly.

Referring to the drawings, an animal drinking fountain 1 is heated from gas held in a gas cylinder 2 located adjacent the fountain 1 and connected thereto by a pipe 3.

A burner 4 is located above a partition 5 in a substantially cylindrical casing 13. The partition 5 is provided with a plurality of apertures 6 spaced about the periphery of the partition to permit the free flow of air between the upper and lower parts of the casing without undue drafts that might extinguish the burner 4.

The burner 4 is joined to the main gas supply pipe 3 from the gas tank 2 by a nipple 7 and elbow 8. The nipple 7, which is vertical, contains an aperture 9, providing a primary vent for the admission of primary air to the burner.

The burner head 4, which is screw threaded onto the nipple 7, comprises a cap having a closed top and a plurality of apertures 10 spaced about the side walls of the cap in a single horizontal plane. Annular flanges 11—11 are secured on their inner periphery to the outer walls of the cap above and below the apertures and form shields for the flame emitted from the apertures 10.

The casing 13 has a partially closed top provided with a central opening 12 which provides an exit for the products of combustion.

The side walls of the casing 13 are provided throughout the length thereof with a plurality of small holes 15 which are small enough to prevent gusts of wind from entering the casing either to extinguish the flame from the burner 4 or to carry in dirt which might result in clogging the burner or the primary air vent 9, and are sufficient in number to supply both primary air to the aperture 9 below the partition 5 and secondary air above the partition 5 to the burner head 4.

It will be noted that the casing 13 below the partition 5 forms a shield for the large aperture 9 which precludes the passage of dirt through the aperture 9 which might clog the burner 4.

The entire heater unit is mounted beneath the water pans in the fountain 1 and is surrounded by a casing or frame 14.

It will, of course, be realized that the hereinbefore described form of the invention is intended merely to illustrate the principles involved and that various changes in size, shape and arrangement of parts may be made without departing from the spirit of the invention or the scope of the sub-joined claims.

That which is claimed as new and is desired to be secured by United States Letters Patent is:

1. In a heater of the character described, a casing having a plurality of relatively small apertures therethrough closely spaced over a wide area to allow for the ingress and egress of air to the interior of said casing without the creation of undue drafts, a partition mounted in said casing intermediate the upper and lower ends thereof and dividing the casing into an upper burner chamber and a lower mixing chamber, a gas burner in said upper chamber adapted to receive secondary air through the apertures in the upper chamber to promote combustion, a supply pipe for said burner extending substantially vertically through said partition and having an aperture in the mixing chamber through which primary air is supplied to the burner from apertures in the lower chamber, and means extending through the side walls of said mixing chamber to supply gas to said supply pipe.

2. A heater of the character described comprising a casing having a plurality of relatively small apertures therethrough closely spaced over a wide area to allow for the ingress and egress of air to the interior of said casing without the creation of undue drafts, a partition mounted in said casing intermediate the upper and lower ends thereof and dividing the chamber into an upper burner chamber and a lower mixing chamber, a gas burner in said upper chamber adapted to receive secondary air through the apertures in the upper chamber to promote combustion, said burner comprising a burner head having a plurality of apertures for the egress of gas, a shield above said apertures and a shield below said apertures, said shield being located adjacent the burner aperture, a supply pipe for said burner extending substantially vertically through said apertures and having an aperture in the mixing chamber through which primary air is supplied to the burner from apertures in the lower chamber, and means extending through the side walls of said mixing chamber to supply gas to said supply pipe.

3. In a heater of the character described, a casing having a plurality of relatively small apertures therethrough closely spaced over a wide area to allow for the ingress and egress of air to the interior of said casing without the creation of undue drafts, a partition mounted in said casing intermediate the upper and lower ends thereof and dividing the casing into an upper burner chamber and a lower mixing chamber, a gas burner in said upper chamber adapted to receive secondary air through the apertures in the upper chamber to promote combustion, a supply pipe communicating with said burner, extending through said partition and through said side wall, said supply pipe having an aperture in the mixing chamber within said casing through which primary air is supplied to the burners from apertures in the lower chamber.

CHARLES A. GUNTHER.
CHARLES R. VITTETOE.

References Cited in the file of this patent

UNITED STATES PATENTS

| Number | Name | Date |
|---|---|---|
| 49,469 | Caldwell | Aug. 15, 1865 |
| 884,395 | Law | Apr. 14, 1908 |
| 906,998 | Bollin | Dec. 15, 1908 |
| 1,397,160 | Campbell | Nov. 15, 1921 |
| 1,541,685 | Cawood | June 9, 1925 |
| 1,600,712 | Buttner | Sept. 21, 1926 |
| 1,884,764 | Lonergan | Oct. 25, 1932 |
| 2,142,418 | Stocker | Jan. 3, 1939 |
| 2,163,395 | Densham | June 20, 1939 |
| 2,430,887 | Ray | Nov. 18, 1947 |

FOREIGN PATENTS

| Number | Country | Date |
|---|---|---|
| 766,815 | France | Apr. 23, 1934 |